(12) United States Patent
Simmonds (10) Patent No.: US 9,465,213 B2
(45) Date of Patent: Oct. 11, 2016

(54) WAVEGUIDES

(75) Inventor: Michael David Simmonds, Rochester (GB)

(73) Assignee: BAE SYSTEMS plc, London (GB)

( * ) Notice: Subject to any disclaimer, the term of this patent is extended or adjusted under 35 U.S.C. 154(b) by 855 days.

(21) Appl. No.: 13/133,117

(22) PCT Filed: Dec. 10, 2009

(86) PCT No.: PCT/GB2009/051681
§ 371 (c)(1),
(2), (4) Date: Jun. 6, 2011

(87) PCT Pub. No.: WO2010/067116
PCT Pub. Date: Jun. 17, 2010

(65) Prior Publication Data
US 2011/0235179 A1    Sep. 29, 2011

(30) Foreign Application Priority Data

Dec. 12, 2008  (EP) ..................................... 08275086
Dec. 12, 2008  (GB) ................................... 0822689.6

(51) Int. Cl.
*G02B 6/28*     (2006.01)
*G02B 27/00*    (2006.01)
*G02B 6/34*     (2006.01)
*G02B 6/42*     (2006.01)
(Continued)

(52) U.S. Cl.
CPC .............. *G02B 27/0081* (2013.01); *G02B 6/34* (2013.01); *G02B 6/4298* (2013.01); *G02B 27/0103* (2013.01); *G02B 27/0172* (2013.01); *G02B 5/18* (2013.01); *G02B 6/0038* (2013.01); *G02B 2027/0125* (2013.01)

(58) Field of Classification Search
CPC .............. G02B 6/0028; G02B 6/0038; G02B 27/0101; G02B 27/0172
USPC ........................ 353/33; 359/567, 630; 385/27
See application file for complete search history.

(56) References Cited

U.S. PATENT DOCUMENTS 4,711,512 A * 12/1987 Upatnieks .......... G02B 27/0103
345/7
5,224,198 A *  6/1993 Jachimowicz et al. ....... 385/133
(Continued)

FOREIGN PATENT DOCUMENTS

EP        0535402 A    4/1993
WO     2004109349 A2  12/2004
(Continued)

OTHER PUBLICATIONS

Search Report in related European application No. 08275086.0 mailed May 25, 2009.
(Continued)

*Primary Examiner* — Steven H Whitesell Gordon
*Assistant Examiner* — Jerry Brooks
(74) *Attorney, Agent, or Firm* — Finch & Maloney PLLC (57) ABSTRACT

An image-providing light source device 58 is arranged to inject a non-coherent and collimated image into waveguide element 60. Light forming the image is dispersed by an optical element 76 so as to occupy a continuum of angles within the waveguide 60. The optical element 76 and a grating 70 are arranged such that the light exiting the waveguide occupies a single angle. Thereby, pupil banding of light exiting the waveguide 60 is mitigated.

11 Claims, 4 Drawing Sheets

(51) Int. Cl.
*G02B 27/01* (2006.01)
*G02B 5/18* (2006.01)
*F21V 8/00* (2006.01)

(56) References Cited

U.S. PATENT DOCUMENTS

| | | | |
|---|---|---|---|
| 7,418,170 B2 * | 8/2008 | Mukawa et al. | 385/31 |
| 2006/0132914 A1 * | 6/2006 | Weiss et al. | 359/462 |
| 2006/0291021 A1 | 12/2006 | Mukawa | |

FOREIGN PATENT DOCUMENTS

| | | | |
|---|---|---|---|
| WO | 2006064325 A | 6/2006 | |
| WO | 2007029032 A | 3/2007 | |
| WO | 2007029034 A1 | 3/2007 | |
| WO | 2007036936 A1 | 4/2007 | |
| WO | 2008148927 A | 12/2008 | |

OTHER PUBLICATIONS

International Search Report in related application PCT/GB2009/051681 mailed Mar. 15, 2010.

Search Report in related British application No. 0822689.6 mailed Mar. 31, 2009.

International Preliminary Report on Patentability in related application No. PCT/GB2009/051681 mailed Jun. 23, 2011.

* cited by examiner

WAVEGUIDES

CROSS REFERENCE TO RELATED APPLICATIONS

This is the U.S. National Phase of PCT/GB2009/051681, filed Dec. 10, 2009, which claims priority to British Patent Application No. 0822689.6, filed Dec. 12, 2008 and European Patent Application No. 08275086.0 filed Dec. 12, 2008, each of which are incorporated by reference herein in their entireties.

This invention relates to a waveguide and a projection display for displaying an image to an observer, which is particularly, but not exclusively, suitable for use in a head up display, a helmet mounted display or head mounted display.

Figure 1:
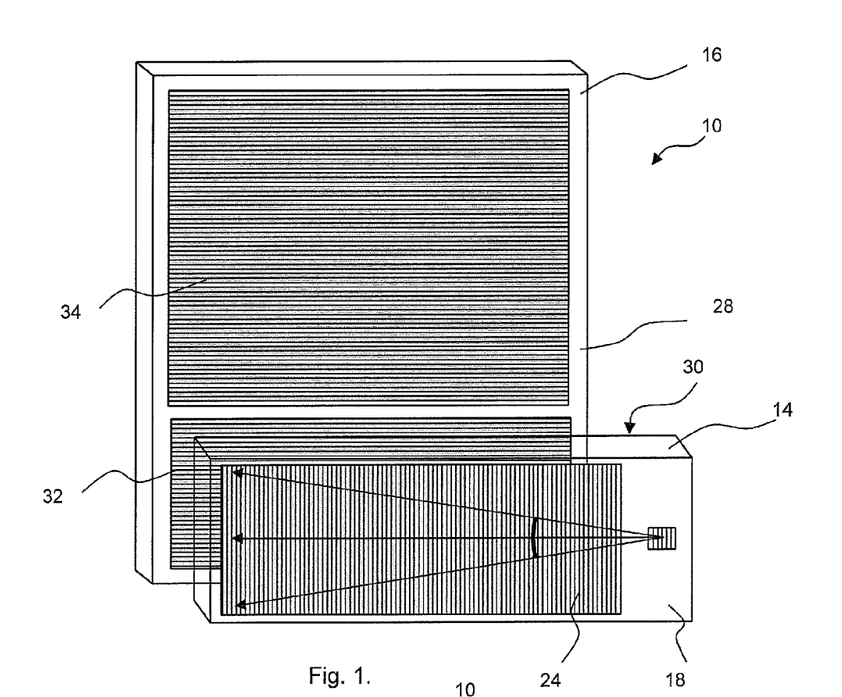
FIG. 1 illustrates, in perspective view, a prior art projection display including parallel waveguides.
Figure 2:
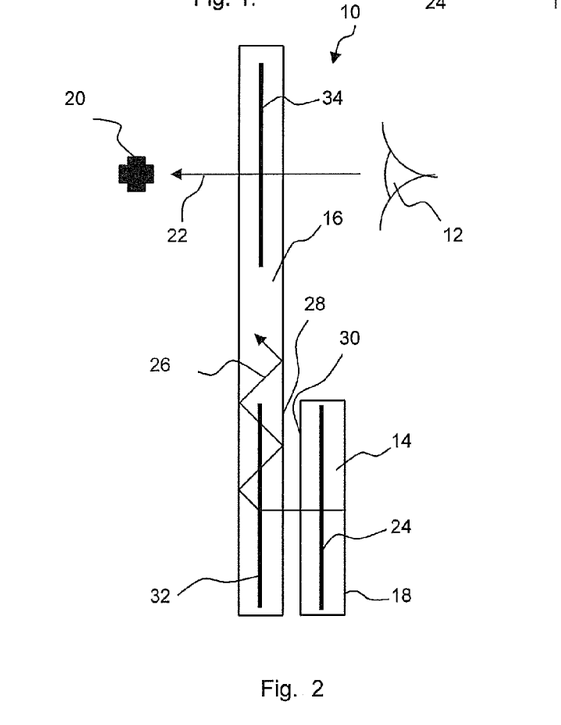
FIG. 2 illustrates, in elevation view, the prior art projection display of FIG. 1.

Referring to FIGS. 1 and 2, wherein like references have been used to indicate similar integers, prior art International patent application publication number WO2007/029032 teaches a projection display 10 for displaying an image to an observer 12 that uses waveguide techniques to generate a collimated display defining a large exit pupil at the point of the observer 12 and a large field of view, whilst using a small image-providing light source device. The projection display 10 uses a first plate-like waveguide 14 made of light transmissive material such as glass or plastic and a second plate-like waveguide 16 made from a light transmissive and light transparent material such as glass or plastic. The projection display 10 additionally includes an image-providing light source device, not shown, located to inject image bearing light into the first plate-like waveguide 14 through a first face 18.

The image-providing light source device includes a micro-display arranged to provide information to be displayed to the observer 12. Additionally the image-providing light source device includes a collimating optical arrangement located between the micro-display and the first face 18 of the first plate-like waveguide 14. The collimating optical arrangement is operable to collimate light received from the micro-display and to inject the collimated image bearing light into the first plate-like waveguide 14 through the first face 18.

The collimated image bearing light produced by the collimating optical arrangement has a small exit pupil and is fed into the first plate-like waveguide 14, which performs the function of stretching the horizontal pupil of the final display. The output from the first plate-like waveguide 14 is fed into the second plate-like waveguide 16, which is arranged to stretch the vertical pupil of the final display and also to act as a combiner for the projection display 10 through which the observer 12 views an outside world scene 20 along a line of sight 22 of the observer 12 through the second plate-like waveguide 16 with information to be displayed to the observer 12 overlaid on the outside world scene 20. In this manner, the image to be displayed to the observer 12 looking through the second plate-like waveguide 16 defines a large exit pupil and a large field of view whilst using a small image generating light source.

Image bearing light injected into first plate-like waveguide 14, via first face 18 is incident on a first grating 24 arranged internally within the first plate-like waveguide 14 and substantially parallel with the first face 18. Light impinging on the first grating 24 diffracts therefrom such that the incidence angle of the light on the internal surfaces of the first plate-like waveguide 14 is greater than the critical angle for the material from which the first plate-like waveguide 14 is made. The image bearing light is constrained within the first plate-like waveguide 14 to propagate along the first plate-like waveguide 14 reflecting from each internal surface in turn to follow a predefined light path 26. Thus, the relative field angles of the light incident on the first plate-like waveguide 14 at the first face 18 are preserved within the first plate-like waveguide 14 and the information required to regenerate the original image is preserved.

The first grating 24 also serves to radiate the image bearing light out of the first plate-like waveguide 14. The first grating 24 is a low efficiency grating which diffracts a small amount of light out of the first plate-like waveguide 14 on each interaction with incident image bearing light.

The second plate-like waveguide 16 is located with a first face 28 parallel with a second face 30 of the first plate-like waveguide 14 and is arranged to receive the image bearing light exiting the second face 30 of the first plate-like waveguide 14. The second face 30 is parallel to the first face 18 of the first plate-like waveguide 14. The first face 28 of the second plate-like waveguide 16 is located adjacent and close to the second face 30 of the first plate-like waveguide 14. The second plate-like waveguide 16 includes a second grating 32 located therein arranged substantially parallel to the first face 28 of the second plate-like waveguide 16 and the second grating 32 is operable to diffract each impinging ray of image bearing light received from the first grating 24 of the first plate-like waveguide 14 at an angle that is larger than the critical angle for the material from which the second plate-like waveguide 16 is made. Accordingly, received image bearing light will propagate inside the second plate-like waveguide 16 to follow the predefined light path 26. The image bearing light continues along the light path 26 to a third grating 34 arranged on or within the second plate-like waveguide 16, which is arranged to diffract the received image bearing light out of the second plate-like waveguide 16 towards the observer 12.

The second grating 32 is arranged such that its diffractive power is rotated through 90 degrees to that of the diffractive power of the first grating 24 to rotate incident image bearing light towards the third grating 34.

The third grating 34 is a low efficiency grating, such that as image bearing light propagates along the light path 26 within the second plate-like waveguide 16, each interaction with the third grating 34 causes a small proportion of the image bearing light to be diffracted out of the second plate-like waveguide 16. Image bearing light which is not diffracted out of the second plate-like waveguide 16 continues to propagate within the second plate-like waveguide 16. Accordingly, a large number of parallel rays of image bearing light exit the second plate-like waveguide 16 through the third grating 34 towards the observer 12, which originated at discrete points on the micro-display forming the image generating light source device. As the relative field angles of the image bearing light have been preserved within the first and second plate-like waveguides 14, 16, the correct image to be conveyed to the observer 12 is presented for viewing when the observer 12 views an outside world scene 20 through the second plate-like waveguide 16.

However, in such a prior art projection display 10, at particular viewing angles of the observer 12 relative to the second plate-like waveguide 16, individual pupils of image bearing light exiting the second plate-like waveguide 16 do not overlap and the phenomenon of pupil banding can be perceived by the observer 12. Pupil banding is the modulation of the intensity of the image bearing light, as perceived by the observer 12, as the line of sight 22 of the observer 12 through the second plate-like waveguide 16 alters relative to the image presented to the observer 12.

Figure 3:
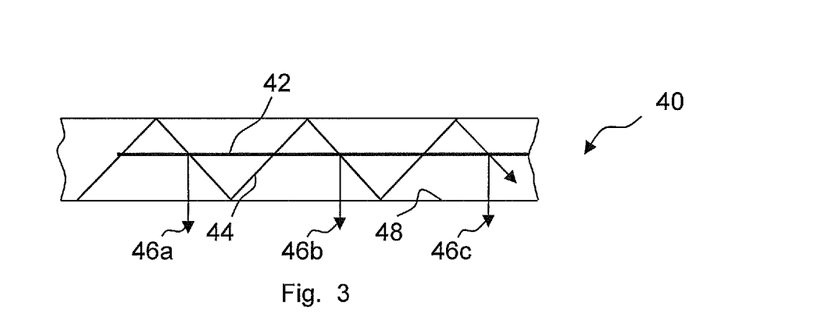
FIG. 3 illustrates, in elevation view, the second waveguide of the prior art projection display of FIGS. 1 and 2.

Referring to FIG. 3, a second plate-like waveguide 40 includes a third grating 42 arranged such that impinging image bearing light following a light pathway 44 is either diffracted out of the second plate-like waveguide 40 as a pupil of image bearing light 46a to 46c for viewing by an observer, not illustrated, or image bearing light passes through the third grating 42 and is reflected by internal surface 48 of the second plate-like waveguide 40 so as to propagate further through the second plate-like waveguide 40 and hence impinge on the third grating 42 again.

It should be noted that the individual pupils of image bearing light 46a to 46c exiting the second plate-like waveguide 40 as illustrated are the centres of the output pupils and are regularly spaced. Since the individual pupils of image bearing light 46a to 46c are regularly spaced and do not overlap, if the eye of the observer moves across the second plate-like waveguide 40 or the angular direction from which the observer looks through the second plate-like waveguide 40 changes, the intensity of the image bearing light from each pupil of image bearing light 46a to 46c will appear to modulate. This results in the phenomenon of pupil banding that can be perceived by the observer.

According to a first aspect of the invention a projection display, for displaying an image to an observer, includes a first waveguide element arranged to be light transmissive, an image-providing light source device arranged to generate an image and to inject image bearing light into the first waveguide element, a first grating associated with the first waveguide element arranged to direct the image bearing light internally along the first waveguide element under total internal reflection and via which the image bearing light is outputted from the first waveguide element, a second waveguide element arranged to be light transmissive and transparent that includes a second grating arranged to receive the image bearing light from the first waveguide element and to direct the image bearing light along the second waveguide element under total internal reflection, the second waveguide element further includes a third grating arranged to diffract received image bearing light out of the second waveguide element towards an observer and wherein an optical element associated with each waveguide element is arranged to disperse incident image bearing light such that each discrete point in the field of view of the image to be viewed by the observer occupies a continuum of angles within the first and second waveguide elements.

In this manner, pupil banding, which has been determined to be caused by maintenance of a single angle for each discrete point in the field of view of the image is mitigated.

The image-providing light source device may be arranged to generate collimated and incoherent image bearing light. In this manner, non-coherent image bearing light can occupy a continuum of angles within each waveguide.

Each optical element and its associated grating within a waveguide element may be arranged such that each discrete point in the field of view of the image exiting the waveguide element occupies a single angle. In this manner, the image to be viewed by an observer will include little or no chromatic aberration.

The continuum of angles may be bounded by a range of angles between the critical angle for total internal reflection of image bearing light within the first and/or second waveguide element and a suitable number of interaction between the image bearing light and the first and/or third grating.

The first and third gratings may be arranged to diffract a portion of image bearing light incident thereon out of the associated waveguide and to allow the remainder of the image bearing light to be transmitted within the associated waveguide under total internal reflection.

One or more of the gratings may be holographic optical elements.

The first waveguide element may be plate-like, the second waveguide element may be plate-like and the first and second waveguide elements may be arranged substantially parallel to one another.

The first waveguide element and the second waveguide element may be arranged substantially in the same plane. The first waveguide element and the second waveguide element may be formed within a single piece of material.

Alternatively, the first waveguide element may be rod-like, the second waveguide element may be plate-like and the first and second waveguide elements may be arranged such the image bearing light exits the first waveguide element along a longitudinal axis of the first waveguide element and enters the second waveguide element to propagate along a propagation axis of the second waveguide element.

According to another aspect of the invention a waveguide includes a substrate of material, a grating arranged to diffract a portion of image bearing light incident thereon out of the substrate of material and to allow the remainder of the image bearing light incident thereon to be transmitted within the substrate of material under total internal reflection, and an optical element arranged to receive and disperse image bearing light such that each discrete point in the field of view of an image to be transmitted by the substrate of material under total internal reflection occupies a continuum of angles within the substrate of material.

In this manner, pupil banding of image bearing light exiting the waveguide is mitigated.

The optical element and grating may be arranged such that each discrete point in the field of view of the image exits the substrate of material as a single angle.

A Head Up Display, or Helmet Mounted Display, or Head Mounted Display may include a projection display or waveguide according to the invention.

The invention will now be described, by way of example only, with reference to the accompanying drawings, in which.

Figure 4:
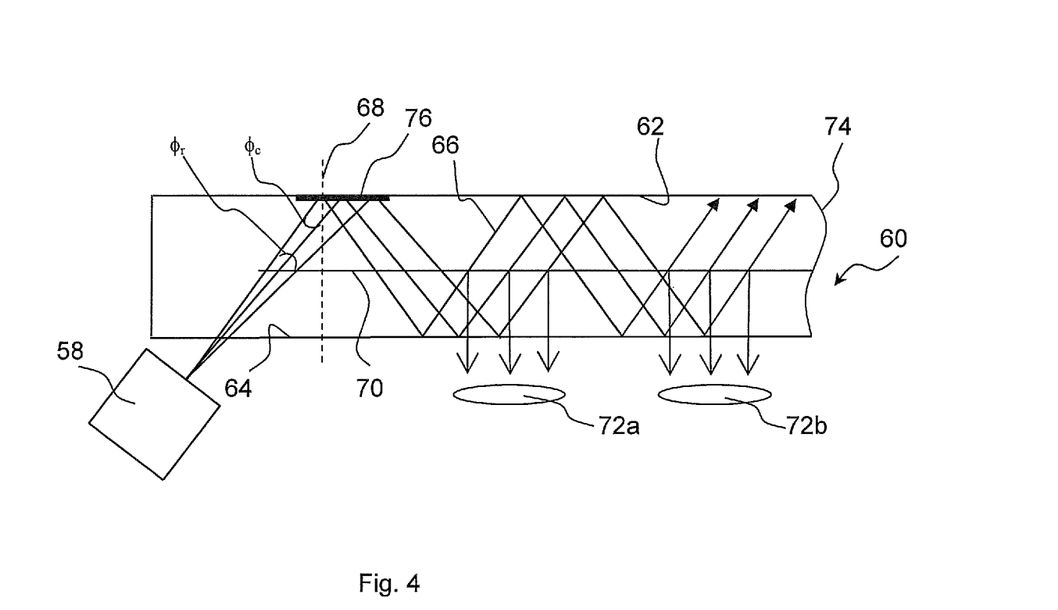
FIG. 4 illustrates, in elevation view, a waveguide for a projection display according to the present invention.

Referring to FIG. 4, there is illustrated a image-providing light source device 58 arranged to inject image bearing light into a waveguide element 60 formed from a substrate of material, comprising a first internal face 62 and a second internal face 64 parallely spaced from one another. The waveguide element 60 is arranged to total internally reflect the injected image bearing light along a light path 66 between the first and second faces 62, 64. In order to achieve total internal reflection of image bearing light along the light path 66, injected image bearing light is arranged to enter the waveguide element 60 at greater than the critical angle $\phi_c$ for the substrate of material from which the waveguide element 60 is formed, as measured from a normal axis 68 to the waveguide element 60.

A grating element 70 carried within the waveguide element 60 is arranged such that impinging image bearing light following the light path 66 is either diffracted out of the waveguide element 60 as a pupil of image bearing light 72a, 72b or the image bearing light passes through the grating element 70 and is reflected by either the first internal face 62 or the second internal face 64 of the waveguide 60 so as to propagate further along the waveguide element 60 towards a distal end 74. Accordingly, the image bearing light internally reflected within the waveguide element 60 will impinge on the grating element 70 further along the light path 66.

It will be understood that the waveguide element 60 can be a light transparent material and used to form either or both of a first or second waveguide element for a projection display as further described below with reference to FIGS. 8 and 9. If the waveguide element 60 is utilized as a second waveguide element then it will be arranged to allow an observer, not illustrated, to look through the waveguide element 60 whilst also arranged to allow propagation of image bearing light along the light path 66. The observer will view the pupils of image bearing light 72a, 72b overlaid on a forward scene, not illustrated, through the waveguide 60.

The image-providing light source device 58 utilises a non-coherent light source and suitable display generator to create collimated image bearing light. The image bearing light is arranged to enter the waveguide element 60 to allow total internal reflection and to be incident upon an optical element 76 arranged to disperse the incident image bearing light such that each discrete point in the field of view of the image to be generated occupies a continuum of angles $\phi_r$ within the waveguide element 60. The dispersion of the image bearing light by the optical element causes each discrete point in the field of view of an image to occupy a continuum of angles $\phi_r$ within the waveguide element 60 which mitigates the effects of pupil banding. The optical element 76 can be formed from a holographic optical element. Furthermore, the power of the optical element and associated grating 70 are conjugated such that image bearing light exiting the waveguide element 60 will occupy a single angle again, thereby mitigating chromatic aberration when viewed by an observer.

Accordingly, the image-providing light source device 58 includes a non-coherent light source, for example a Light Emitting Diode or Organic Light Emitting Diode used with a suitable display generator or an emissive display source such as an active matrix Organic Light Emitting Diode.

Figure 5:
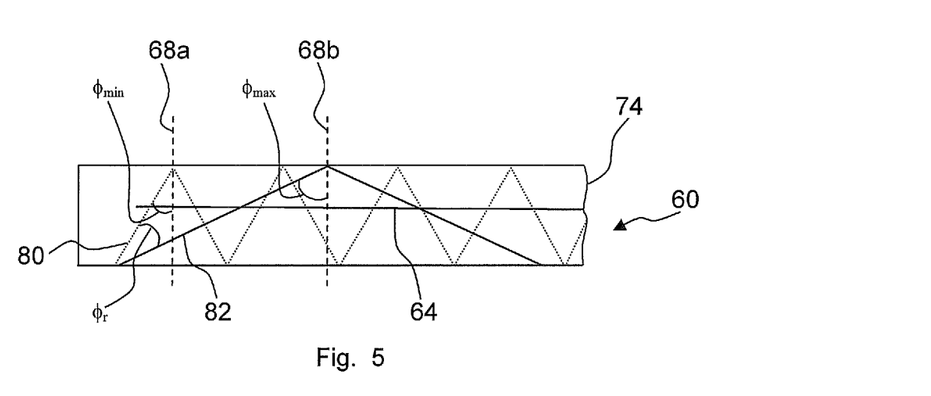
FIG. 5 illustrates, in elevation view, a waveguide for a projection display according to the present invention and the selection of angles for injection of image bearing light into the waveguide.

Referring to FIG. 5, wherein like references have been used to indicate similar integers to those described with reference to FIG. 4, there is illustrated the range of the continuum of angles $\phi_r$ desirable within the waveguide element 60. Image bearing light can be injected into the waveguide 60 between the angles $\phi_{min}$ and $\phi_{max}$, as measured from a normal axis 68a or 68b, respectively, to the waveguide element 60, to follow light paths 80 and 82 towards the distal end 74 of the waveguide element 60. The angle $\phi_{min}$ will be greater than or equal to the critical angle to allow total internal reflection of image bearing light within the material from which the waveguide element 60 is formed, whilst the angle $\phi_{max}$ will depend on the permissible minimum number of interactions between image bearing light following light path 82 and the grating element 64. It will be understood that with a greater angle $\phi_{max}$ there will be less interactions with the grating element 64. Accordingly, a design compromise exists between the number of interactions between the grating element 64 and image bearing light following light path 82 and the angle $\phi_{max}$ for the continuum of angles for which image bearing light is injected into the waveguide element 60 and hence the degree of pupil banding. The angle $\phi_{max}$ is therefore chosen to mitigate the phenomenon of pupil banding whilst providing enough interaction between the image bearing light and the grating element 64 to diffract image bearing light out of the waveguide element 60.

It will be understood that the injection of image bearing light into the waveguide element 60 can be via one or more reflective, transmissive or refractive optical elements 76. Furthermore, the grating element 64 can be reflective, thereby being arranged on or near one internal surface 62 or 64, or transmissive, thereby being arranged towards the centre of the waveguide element 60.

Figure 6:
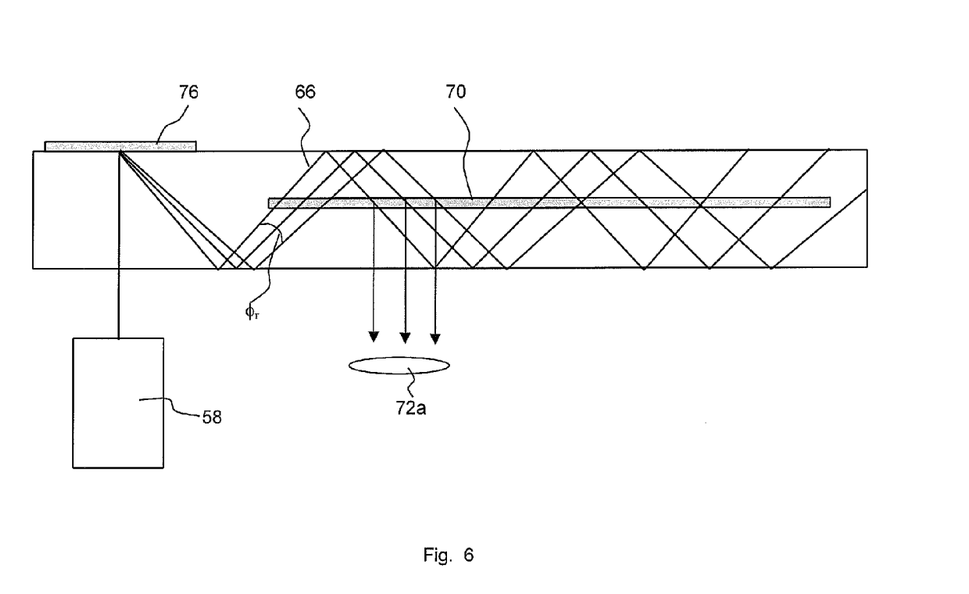
FIG. 6 illustrates, in elevation view, propagation of image bearing light within a waveguide according to the present invention.

Referring to FIG. 6, a single point in the field of view of an image to be generated is illustrated. Image bearing light from an image-providing light source device 58 impinges on an optical element 76, which is arranged to disperse the image bearing light over a range of continuum of angles $\phi_r$, that is between $\phi_{min}$ and $\phi_{max}$. The image bearing light interacts with a grating 70 as it follows light path 66 such that a predefined portion of image bearing light is diffracted to exit the waveguide element 60 to form a pupil 72a of image bearing light.

Such a waveguide element 60 and image-providing light source device 58 can be arranged within in a projection display 110 as described with reference to FIGS. 8 and 9, so that first and second waveguide elements carry image bearing light having a continuum of angles $\phi_r$ between $\phi_{min}$ and $\phi_{max}$ to display an image to an observer whilst mitigating perceived pupil banding.

Figure 7:
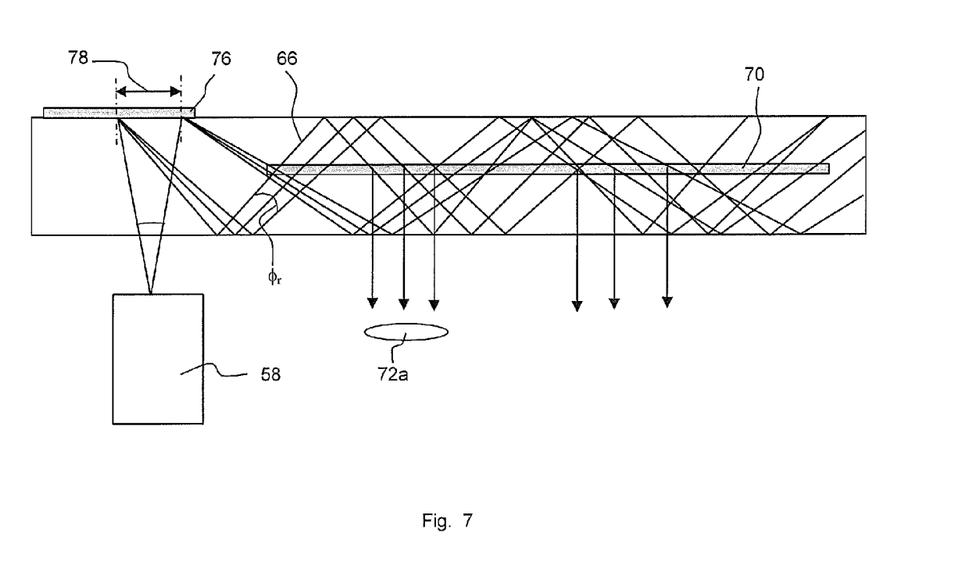
FIG. 7 illustrates, in elevation view, propagation of image bearing light within a waveguide according to the present invention.

Referring to FIG. 7, wherein like references have been used to indicate similar integer to those described with reference to FIG. 6, the extremes of the total field of view of an image to be generated are illustrated. Again, the image bearing light provided by a image-providing light source device 58 impinges on an optical element 76, which disperses the image bearing light over a range of continuum of angles $\phi_r$. The image bearing light interacts with a grating 7 as it follows light path 66 such that a predefined portion of image bearing light is diffracted to exit the waveguide 60 to form pupil 72a of image bearing light. It will be understood that as more opportunity for image bearing light to interact with the grating 70 are provided by dispersing the image bearing light over a continuum of angles $\phi_r$, more pupils of image bearing light 72a will exit the waveguide 60, thereby mitigating pupil banding.

Figure 8:
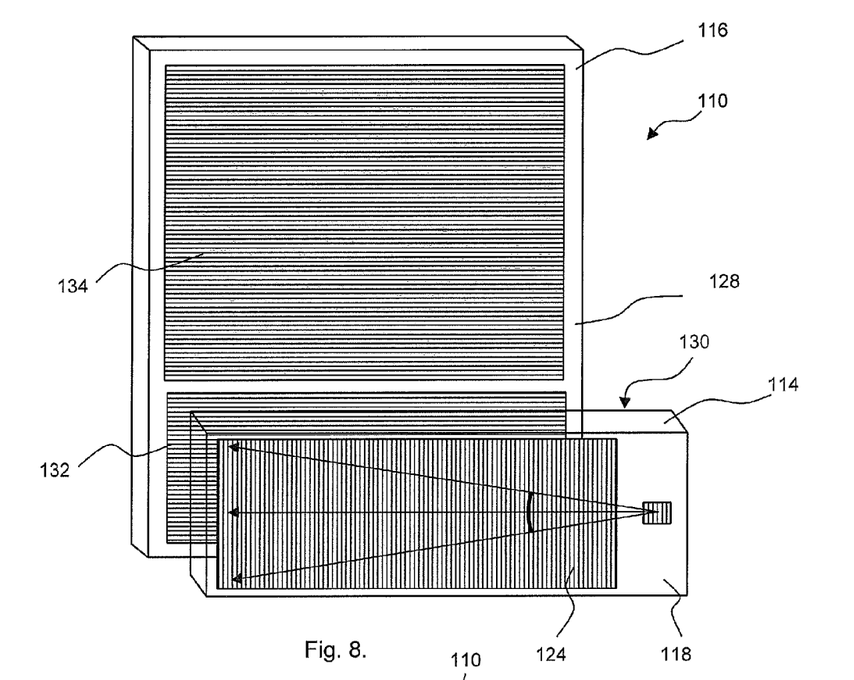
FIG. 8 illustrates, in perspective view, a projection display according to the present invention including parallel waveguides.
Figure 9:
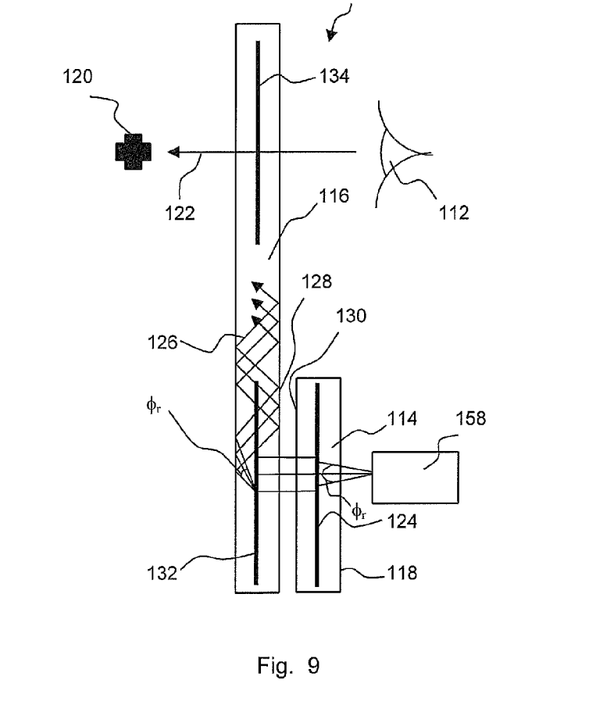
FIG. 9 illustrates, in elevation view, a projection display of FIG. 8.

Referring to FIGS. 8 and 9, wherein like references have been used to indicate similar integers, a projection display according to the invention 110 for displaying an image to an observer 112 that uses waveguide techniques to generate a display defining a large exit pupil at the point of the observer 112 and a large field of view, whilst using a small image-providing light source device 158. The projection display 110 uses a first plate-like waveguide 114 made of light transmissive material such as glass or plastic and a second plate-like waveguide 116 made from a light transmissive and light transparent material such as glass or plastic. The projection display 110 additionally includes an image-providing light source device 158, located to inject collimated image bearing light into the first plate-like waveguide 114 through a first face 118, to impinge on an optical element, not shown, arranged to disperse the image bearing light over a continuum of angles $\phi_r$.

The image-providing light source device 158 includes a micro-display arranged to provide information to be displayed to the observer 112. The image-providing light source device 158 is arranged to inject the image bearing light into the first plate-like waveguide 114 through the first face 118.

The image bearing light produced by the image-providing light source device 158 has a small exit pupil and is fed into the first plate-like waveguide 114, which performs the function of stretching the horizontal pupil of the final display. The output from the first plate-like waveguide 114 is fed into the second plate-like waveguide 116, which is arranged to stretch the vertical pupil of the final display and also to act as a combiner for the projection display 110 through which the observer 112 views an outside world scene 120 along a line of sight 122 of the observer 112 through the second plate-like waveguide 116 with information to be displayed to the observer 112 overlaid on the outside world scene 120. In this manner, the image to be displayed to the observer 112 looking through the second plate-like waveguide 116 defines a large exit pupil and a large field of view whilst using a small image-providing light source device 158.

Image bearing light injected into first plate-like waveguide 114, via first face 118 is also incident on a first grating 124 arranged internally within the first plate-like waveguide 114 and substantially parallel with the first face 118. Light impinging on the first grating 124 diffracts therefrom such that the incidence angle of the light on the internal surfaces of the first plate-like waveguide 114 is greater than the critical angle for the material from which the first plate-like waveguide 114 is made. The image bearing light is constrained within the first plate-like waveguide 114 to propagate along the first plate-like waveguide 114 reflecting from each internal surface in turn to follow a predefined light path 126. Thus, the continuum of relative field angles of image bearing light incident on the first plate-like waveguide 114 at the first face 118 are preserved within the first plate-like waveguide 114 and the information required to regenerate the original image is preserved.

The first grating 124 also serves to radiate the image bearing light out of the first plate-like waveguide 114. The first grating 124 is a low efficiency grating which diffracts a small amount of light out of the first plate-like waveguide 114 on each interaction with incident image bearing light. The first grating 124 and optical element are arranged such that each discrete point in the field of view of the image exiting the first waveguide 114 will occupy a single angle.

The second plate-like waveguide 116 is located with a first face 128 parallel with a second face 130 of the first plate-like waveguide 114 and is arranged to receive the image bearing light exiting the second face 130 of the first plate-like waveguide 114. The second face 130 is parallel to the first face 118 of the first plate-like waveguide 114. The first face 128 of the second plate-like waveguide 116 is located adjacent and close to the second face 130 of the first plate-like waveguide 114. The second plate-like waveguide 116 includes a second grating 132 located therein arranged substantially parallel to the first face 128 of the second plate-like waveguide 116 and the second grating 132 is operable to diffract impinging image bearing light received from the first grating 124 of the first plate-like waveguide 114 at an angle that is larger than the critical angle for the material from which the second plate-like waveguide 116 is made. The second grating can also be arranged to disperse impinging image bearing light over a continuum of angles or a further optical element can be include to perform this function. Accordingly, received image bearing light will propagate inside the second plate-like waveguide 116 to follow the predefined light path 126. The image bearing light continues along the light path 126 to a third grating 134 arranged on or within the second plate-like waveguide 116, which is arranged to diffract the received image bearing light out of the second plate-like waveguide 116 towards the observer 112. Again, the third grating 134 and second grating 132 are arranged such that each discrete point in the field of view of the image exiting the second waveguide 116 will occupy a single angle.

The second grating 132 is arranged such that its diffractive power is rotated through 90 degrees to that of the diffractive power of the first grating 124 to rotate incident image bearing light towards the third grating 134.

The third grating 134 is a low efficiency grating, such that as image bearing light propagates along the light path 126 within the second plate-like waveguide 116, each interaction with the third grating 134 causes a small proportion of the image bearing light to be diffracted out of the second plate-like waveguide 116. Image bearing light which is not diffracted out of the second plate-like waveguide 116 continues to propagate within the second plate-like waveguide 116. Accordingly, a large number of parallel rays of image bearing light exit the second plate-like waveguide 116 through the third grating 134 towards the observer 112, which originated at discrete points on the micro-display forming the image-providing light source device 158. As the relative field angles of the image bearing light have been preserved when exiting the first and second plate-like waveguides 114, 116, the correct image to be conveyed to the observer 112 is presented for viewing when the observer 112 views an outside world scene 120 through the second plate-like waveguide 116.

The invention claimed is:

1. A projection display, for displaying an image to an observer, including:
   a first waveguide element arranged to be light transmissive;
   an image-providing light source device arranged to generate an image and to inject image bearing light into the first waveguide element;
   a first grating associated with the first waveguide element arranged to direct the image bearing light internally along the first waveguide element under total internal reflection and via which the image bearing light is outputted from the first waveguide element;
   a second waveguide element arranged to be light transmissive and transparent that includes a second grating arranged to receive the image bearing light from the first waveguide element and to direct the image bearing light along the second waveguide element under total internal reflection;
   the second waveguide element further includes a third grating arranged to diffract received image bearing light out of the second waveguide element towards an observer; and wherein an optical element associated with each waveguide element is arranged to receive and disperse a discrete point of image bearing light incident upon the optical element at a single first angle over a continuum of second angles within the respective first and second waveguide elements.

2. A projection display, as claimed in claim 1, wherein the image-providing light source-device is arranged to generate collimated and incoherent image bearing light.

3. A projection display, as claimed in claim 1, wherein each optical element and its associated grating within each waveguide element are arranged such that a portion of the dispersed discrete point of image bearing light exits the respective waveguide element at the single first angle.

4. A projection display, as claimed in claim 1, wherein the continuum of second angles is bounded by a range of angles between a critical angle for total internal reflection of image bearing light within the first and/or second waveguide element and a suitable number of interactions between the image bearing light and the first and/or third grating.

5. A projection display, as claimed claim 1, wherein the first and third gratings are arranged to diffract a portion of image bearing light incident thereon out of the associated waveguide and to allow a remainder of the image bearing light to be transmitted within the associated waveguide under total internal reflection.

6. A projection display, as claimed in claim 1, wherein one or more of the gratings are holographic optical elements.

7. A projection display, as claimed claim 1, wherein the first waveguide element is plate-like, the second waveguide element is plate-like and the first and second waveguide elements are arranged substantially parallel to one another.

8. A projection display, as claimed in claim 1, wherein the first waveguide element and the second waveguide element are arranged substantially in the same plane.

9. A projection display, as claimed in claim 8, wherein the first waveguide element and the second waveguide element are formed within a single piece of material.

10. A projection display, as claimed in claim 1, wherein the first waveguide element is rod-like, the second waveguide element is plate-like and the first and second waveguide elements are arranged such the image bearing light exits the first waveguide element along a longitudinal axis of the first waveguide element and enters the second waveguide element to propagate along a propagation axis of the second waveguide element.

11. A Head Up Display, or Helmet Mounted Display, or Head Mounted Display including a projection display as claimed in claim 1.

* * * * *